United States Patent [19]

Nightingale

[11] Patent Number: 4,463,902
[45] Date of Patent: Aug. 7, 1984

[54] VARIABLE GEOMETRY NOZZLE WITH THRUST REVERSER FOR A TURBOMACHINE

[75] Inventor: Douglas J. Nightingale, Atlanta, Ga.

[73] Assignee: Rolls-Royce Inc., New York, N.Y.

[21] Appl. No.: 366,390

[22] Filed: Apr. 7, 1982

[51] Int. Cl.³ .......................... F02K 1/12; F02K 1/32; F02K 1/60
[52] U.S. Cl. .......................... 239/265.17; 239/265.29; 239/265.37
[58] Field of Search .................. 239/265.17, 265.19, 239/265.25–265.29, 265.33, 265.37–265.41; 60/226.1, 226.2, 228, 229, 271; 244/12.5, 23 D

[56] References Cited

U.S. PATENT DOCUMENTS 3,734,411 5/1973 Wolf et al. ................... 239/265.29

FOREIGN PATENT DOCUMENTS 1200691 7/1970 United Kingdom ........... 239/265.29

*Primary Examiner*—Andres Kashnikow
*Attorney, Agent, or Firm*—Cushman, Darby & Cushman

[57] ABSTRACT

A nozzle for a gas turbine aero engine comprises two spaced inner and outer ducts 16,19 with a mechanism for varying the geometry of the nozzle exit. Air inlet openings 21 are provided downstream of the ducts. The mechanism comprises two pairs of mutually confronting doors 22,23 downstream of the ducts 16,19 and two pairs of pivotal flaps 26,27 mounted downstream of the doors 22,23. The inner doors 23 are provided with a convoluted mixer chute assembly 24 and serve to define the throat of the nozzle whereas the outer doors 22 serve to close off the air inlets 21 or open them, and also form a thrust reverser. The pressures acting on flaps 26,27 cause them to readjust their attitude to form a parallel or divergent part of the nozzle.

3 Claims, 3 Drawing Figures

VARIABLE GEOMETRY NOZZLE WITH THRUST REVERSER FOR A TURBOMACHINE

This invention relates to nozzles for gas tubrine aero-engines and is particularly concerned with variable geometry nozzles and the suppression of the infra-red radiation emitted by the hot exhaust plume of such engines.

Modern combat aircraft require the flexibility of being able to fly at subsonic or supersonic speeds and to perform a variety of roles. In some roles it is necessary to augment the basic thrust produced by the engine in the "dry" mode by burning additional fuel downstream of the engine's turbines, utilizing the unburnt oxygen in the exhaust gases to support combustion. This mode is known as reheat or afterburning. During reheat it is necessary to increase the area of the nozzle to accommodate the increased volume of gases so as not to impair the efficient functioning of the engine. In other roles such as supersonic cruise, it is desirable to vary the geometry of the exhaust nozzle of the engine from a convergent geometry for subsonic speed to a configuration having an increased area throat (compared to that required during the "dry" mode or at subsonic cruise) formed between a convergent and divergent part of the nozzle often referred to as a con-di nozzle.

There are times during the flight envelope of an aircraft when re-heat is not required and when the prime requisite is to reduce the infra-red emission of the exhaust plume and thereby reduce or avoid detection by heat seeking missiles directed towards the aircraft. These missiles usually detect the infra-red radiation of the hot exhaust gas plume, and once the plume is located, home in on the hot parts of the engine to destroy the aircraft.

There is a need for a nozzle design that not only caters for dry and reheat modes of operation, but also enables one selectively to reduce the infra-red emission of the engine.

An object of the present invention is to provide a variable geometry nozzle which is capable of use both in the dry and reheat modes of operation and also capable of reducing the infra-red emission of the hot exhaust gas plume.

The invention as claimed enables one to vary the geometry of the nozzle to cope with dry and reheat modes of operation by moving the flaps and enables one to reduce the infra-red emission by opening additional air inlets which admit ambient air to cool and shield the hot exhaust plume.

The nozzle of the present invention may be installed on a fixed jet pipe or on a vectorable jet pipe. Furthermore, the nozzle of the present invention may be installed on the vectorable front nozzles of an engine such as the Rolls-Royce Limited Pegasus engine which discharge cold or reheated by-pass air.

The invention will now be described by way of an example with reference to the accompanying drawings in which.

Figure 1:
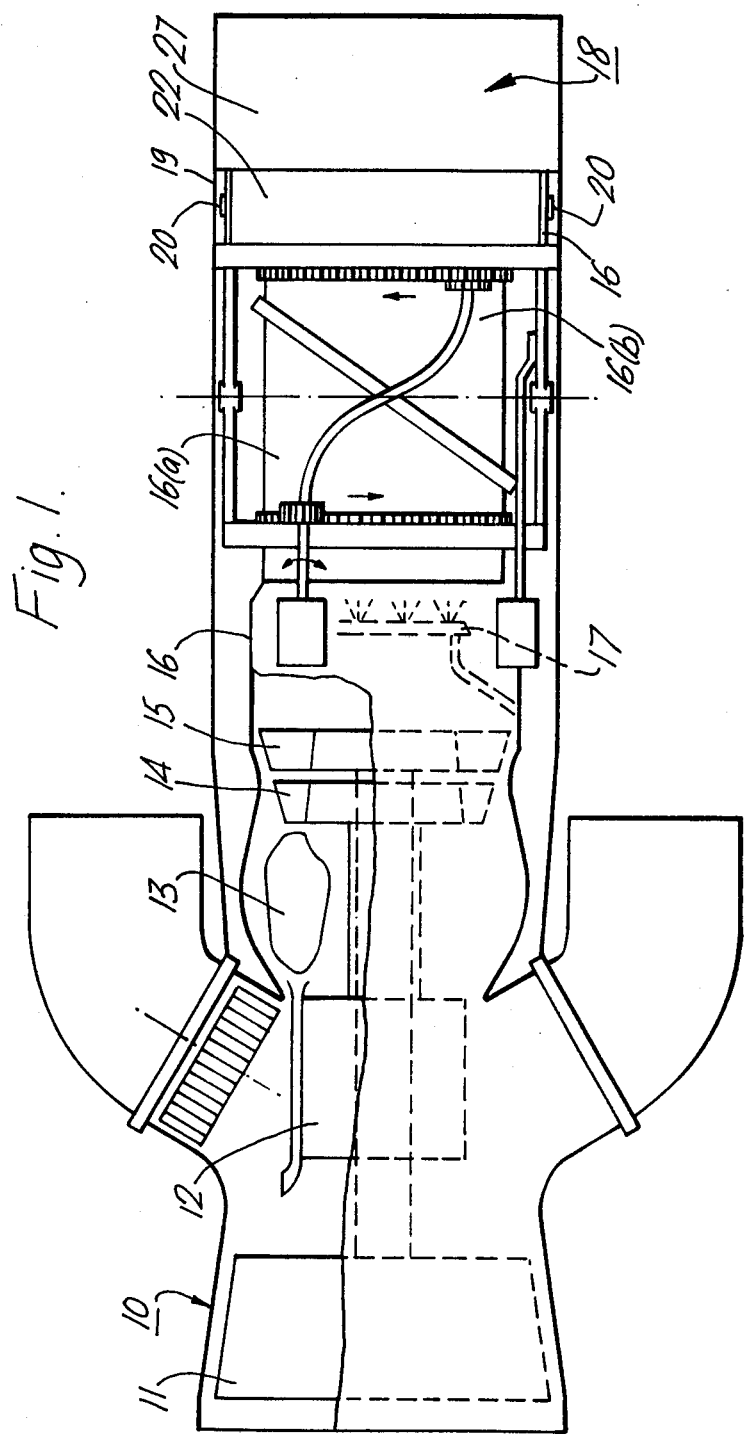
FIG. 1 illustrates schematically a gas turbine engine fitted with a variable geometry nozzle constructed in accordance with the present invention.

Referring to FIG. 1 there is shown schematically a gas turbine aero engine 10 comprising in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, a jet pipe 16 having a reheat burner 17, and a variable geometry nozzle 18 constructed in accordance with the present invention.

Figure 2:
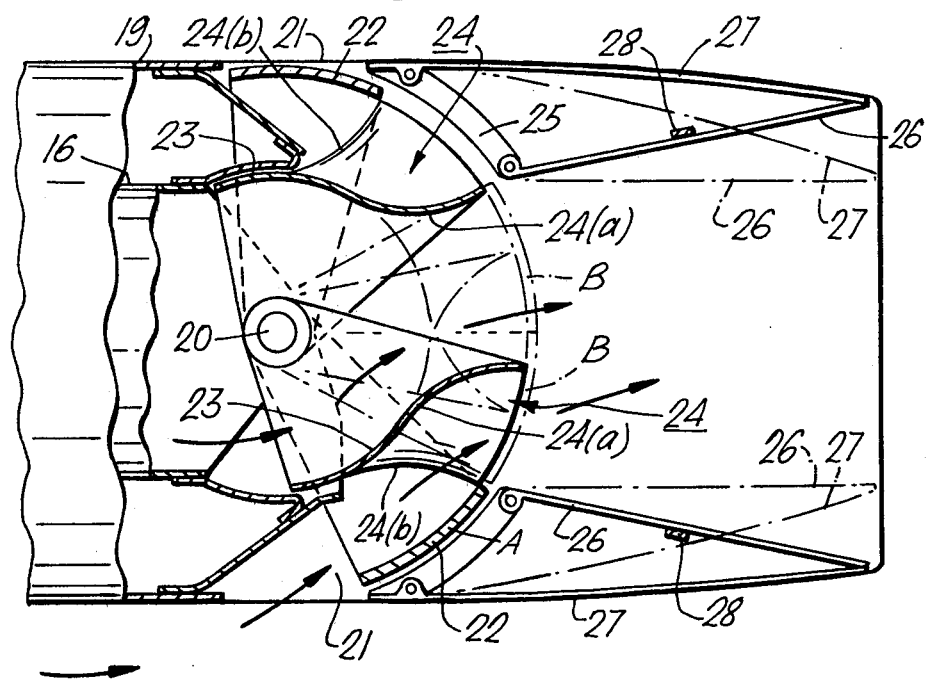
FIGS. 2 and 3 illustrate in greater detail cross-sectional views of part of the rear nozzle of the engine of FIG. 1.

Referring now to FIG. 2 the nozzle 18 comprises spaced ducts constituted by the jet pipe 16 and an outer casing 19. The jet pipe 16 and outer casing 19 are of rectangular cross-sectional shape at their downstream ends. Either the jet pipe 16 or the casing 19 is provided with trunnions 20 which extend along an axis that is transverse to the length of the jet pipe. The outer casing 19 is provided with air inlet openings 21 at its downstream end in the upper and lower walls of the casing.

Mounted on the trunnions 20 are two pairs of clamshell doors 22, 23. The doors 22 are spaced radially outwards of the doors 23 and are provided for closing the air inlets. The inner pair of doors 23 in a first position define a convergent throat of the nozzle. Attached to the downstream end of each inner doors 23 is a mixer chute assembly 24. The mixer chute assembly 24 is a convoluted or fluted metal structure the radially innermost extremities of the peaks of the convolutions being shown in FIG. 2 by the line 24(a) and the radially outermost extremities of the peaks of the convolutions being shown by the line 24(b). As will be seen the downstream end of the mixer chutes blend into the upstream inner wall of a fixed structure 25 that forms part of the outer casing 19 when the doors are rotated forwards to their foremost position.

The fixed structure 25 has pivotally attached to a downstream end thereof two pairs of flaps 26, 27. The flaps 26, 27 are connected together at their downstream ends in a manner that allows one to slide relative to the other. A constraining means 28 is provided to restrict the outwards movement of the flaps 26. The flaps 26, 27 are mounted between fixed side walls of the outer casing 19.

Figure 3:
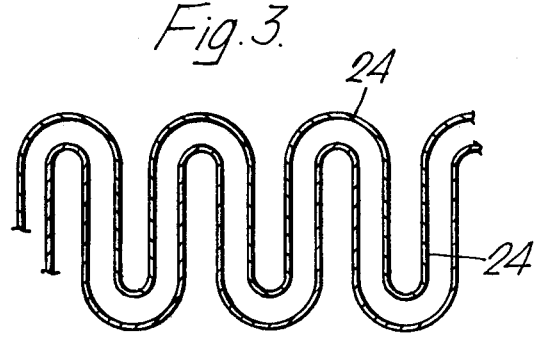

Referring to FIG. 3 there is shown a cross sectional view of the mixer chute assemblies when in thrust reverse. It will be seen that the chutes of one of the mixer chute assemblies 24 is of a complementary shape to that of the other, and is constructed so that the mixer chutes intermingle when the doors 23 are moved to a thrust reverse position (shown dotted in FIG. 2).

In operation a reheat mode is achieved by rotating the inner and outer doors 22, 23 simultaneously forward to close off the air inlet openings 21 as shown in the upper part of FIG. 2. In this position the doors 23 together with the mixer chutes 24 effectively define a minimum throat area. The pressure downstream of the throat acting on the flaps 26 and ambient pressure acting on the flaps 27 cause them to adjust their positions automatically to form a parallel or slightly convergent or slightly divergent portion downstream of the throat.

For infrared suppression the outer doors 22 are rotated rearwards to uncover the air inlets 21 and are stowed alongside the fixed structure 25 (shown as position (A) in FIG. 2), simultaneously the inner doors 23 are rotated rearwards to define the appropriate throat area, and air enters the nozzle through the chutes 24.

For a reheat mode, the doors 22 and 23 are rotated fully forwards to retract the mixer chutes and define a maxim area throat which blends into the fixed structure 25.

For supersonic cruise where a convergent-divergent nozzle is required, the inner doors 23 are rotated to define the appropriate throat area and the pressure acting on the flaps 26, 27 re-adjusts their positions to define a divergent nozzle downstream of the throat defined by the doors 23 and mixer chutes 24.

It will be seen that at all times of operation, the ambient pressure on flaps 27 and the pressure within the nozzle 18 acting on flaps 27 cause the flaps 26, 27 to assume the optimum position for the required mode of operation. It is to be understood however that, if desired, an actuator mechanism may be provided to move the flaps 26, 27 instead of relying on the pressure forces to position the flaps 26, 27.

To achieve a thrust reverse position the inner doors are moved rearwardly to bring the corrugated mixer chutes into interdigitated overlapping engagement with each other (as shown dotted in FIG. 2). The spines of the peaks of the corrugations of the mixer chutes 24 form a deflecting surface together with the doors 23. However, there are gaps between the corrugated mixer chutes 24 so to reduce leakages through these gaps the doors 22 are rotated beyond the position of the doors 23 to bring their downstream edges into mutual engagement.

The hot gases from the jet pipe are ejected between the upstream edges of doors 22 and a fixed wall 29 and the area between these upstream edges of the doors 22 and the wall 29 must be equivalent to the area of the throat defined for a dry mode of operation.

The mechanism for rotating the doors 22 can be operated independently of that for rotating the doors 23, although it is preferable that the two mechanisms are syncronised, at least for the range of movement between reheat and ejector modes of operation.

I claim:

1. A nozzle for a gas turbine aero engine comprising: spaced inner and outer ducts; a pair of confronting walls extending downstream of the ducts; one or more inlet openings adjacent a downstream end of the outer duct; a pair of mutually confronting doors extending between the pair of walls and located downstream of the inner duct, each of which is mounted for rotation about an axis extending transverse to the length of the inner duct, each of the doors being movable to, and from, a first position, where they define therebetween a substantially unrestricted flow path through the inner duct and nozzle, to and from, a second position, where they serve to define a convergent throat for the nozzle; a corrugated mixer chute assembly attached to a downstream end of each first door, the assembly being constructed to define alternate first and second chutes, the first chutes leading from an inlet opening into the flow path through the inner duct and nozzle, and the second chutes leading from the inner duct to the nozzle exit; a second pair of confronting doors each of which is mounted for rotation about an axis extending transverse to the length of the ducts and movable to, and from, a first position, where they obturate the inlet openings, through a second position, where they uncover the inlet openings, to and from a third position, where they uncover the inlet openings, obturate the flow path through the inner duct and nozzle, and redirect gases flowing through the inner duct out through the inlet openings; a pair of first flaps extending between the said pair of walls of which is pivotally mounted at its upstream end to structure downstream of the mixer chute assembly, the pair of first flaps being operable to define boundary walls of the flow path through the nozzle at a region downstream of the first doors; and a pair of second flaps extending between the said pair of walls, each of which is pivotally mounted at its upstream end to structure downstream of the inlet openings, is located outboard of each first flap, and is in sliding engagement at its downstream end with the downstream end of one of the first flaps.

2. A nozzle according to claim 1 wherein the structure on which the first and second pairs of flaps are mounted is a common structure that defines a downstream extremity of the inlet opening.

3. A nozzle according to claim 1 wherein constraining means is provided outboard of the first flaps to restrict the outwards movement of the first flaps.

* * * * *